US012695282B2

(12) United States Patent
Li et al.

(10) Patent No.: US 12,695,282 B2
(45) Date of Patent: Jul. 28, 2026

(54) JUNCTION BOX FOR SWITCHGEAR AND SWITCHGEAR

(71) Applicant: Schneider Electric (China) Co., Ltd., Beijing (CN)

(72) Inventors: Huaying Li, Beijing (CN); Kun Liu, Beijing (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 336 days.

(21) Appl. No.: 18/521,220

(22) Filed: Nov. 28, 2023

(65) Prior Publication Data

US 2025/0038500 A1     Jan. 30, 2025

(30) Foreign Application Priority Data

Jul. 26, 2023   (CN) .......................... 202321986108.3

(51) Int. Cl.
| | |
|---|---|
| *H02G 3/08* | (2006.01) |
| *H02B 1/21* | (2006.01) |
| *H02B 1/36* | (2006.01) |
| *H02B 13/00* | (2006.01) |
| *H02B 13/045* | (2006.01) |

(52) U.S. Cl.
CPC .............. *H02G 3/081* (2013.01); *H02B 1/21* (2013.01); *H02B 1/36* (2013.01); *H02B 13/005* (2013.01); *H02B 13/045* (2013.01)

(58) Field of Classification Search
CPC . H02G 3/081; H02B 1/21; H02B 1/36; H02B 13/005; H02B 13/045
USPC ........................................................ 361/605
See application file for complete search history.

(56) References Cited

U.S. PATENT DOCUMENTS

| | | | | |
|---|---|---|---|---|
| 3,217,211 A | * | 11/1965 | Norden ..................... | H02B 1/36 |
| | | | | 439/378 |
| 4,118,639 A | * | 10/1978 | Rosey ...................... | H02B 1/21 |
| | | | | 361/675 |
| 4,761,521 A | * | 8/1988 | Beck ...................... | H02B 11/00 |
| | | | | 200/50.21 |

(Continued)

FOREIGN PATENT DOCUMENTS

| | | |
|---|---|---|
| CN | 100338837 C | 9/2007 |
| CN | 204205387 U | 3/2015 |

(Continued)

OTHER PUBLICATIONS

Extended European Search Report dated Apr. 15, 2024 for corresponding European Patent Application No. 23212185.5-1201, 6 pages.

*Primary Examiner* — Anatoly Vortman
(74) *Attorney, Agent, or Firm* — Quinn IP Law

(57)     ABSTRACT

A junction box for a switchgear includes: a base arranged within the switchgear, and an output end coupled to the base that includes supply busbars each arranged within the base in a lateral direction, and adapted to be electrically connected to a primary incoming plug of a plurality of drawers at any position along the busbar in the lateral direction to allow power supply to the drawer. An input end includes adapter pieces respectively coupled to the busbar, and electrically connected to the primary plug-in within the switchgear. An insulative protective housing is arranged outside the busbars. The switchgear includes: a junction box arranged within a cabinet, and a drawer coupled to the junction box.

13 Claims, 17 Drawing Sheets

(56)                References Cited

U.S. PATENT DOCUMENTS

| | | | | |
|---|---|---|---|---|
| 5,045,968 | A * | 9/1991 | Suzuyama | H02B 5/06 |
| | | | | 361/612 |
| 6,452,785 | B1 * | 9/2002 | Kaaden | H01R 9/2658 |
| | | | | 361/635 |
| 7,417,846 | B2 * | 8/2008 | Arioka | H02B 13/035 |
| | | | | 361/612 |
| 7,525,809 | B2 * | 4/2009 | Bergmann | H02J 13/0005 |
| | | | | 361/752 |
| 7,718,889 | B2 * | 5/2010 | Rasmussen | H05K 7/1449 |
| | | | | 361/600 |
| 7,847,203 | B2 * | 12/2010 | Narayanan | H02B 11/12 |
| | | | | 200/50.26 |
| 8,045,322 | B2 * | 10/2011 | Kurogi | H02B 13/01 |
| | | | | 361/620 |
| 8,283,585 | B2 * | 10/2012 | Capelli | H02B 11/28 |
| | | | | 200/50.23 |
| 8,363,389 | B2 * | 1/2013 | Jurek | H02B 1/21 |
| | | | | 361/639 |
| 8,379,374 | B2 * | 2/2013 | Keegan | H01R 25/142 |
| | | | | 174/68.2 |
| 8,411,418 | B2 * | 4/2013 | Kikukawa | H02B 13/0354 |
| | | | | 361/612 |
| 8,641,432 | B2 * | 2/2014 | Northey | H01R 12/724 |
| | | | | 439/116 |
| 8,717,741 | B2 * | 5/2014 | Valenzuela | H01R 35/04 |
| | | | | 361/624 |
| 8,791,379 | B2 * | 7/2014 | Kikukawa | H02B 13/01 |
| | | | | 218/140 |
| 10,524,377 | B2 * | 12/2019 | Smith | H05K 7/1492 |
| 11,109,504 | B2 * | 8/2021 | Smith | H01R 25/162 |
| 11,289,884 | B2 * | 3/2022 | Beaver | H02B 1/20 |
| 11,715,939 | B2 * | 8/2023 | Kang | H02B 11/133 |
| | | | | 361/622 |
| 11,901,709 | B2 * | 2/2024 | Fukuoka | H02B 13/045 |
| 2003/0058613 | A1 * | 3/2003 | Varghese | H05K 7/1457 |
| | | | | 361/679.01 |
| 2007/0109731 | A1 * | 5/2007 | Bergmann | H02B 1/21 |
| | | | | 361/624 |
| 2013/0050905 | A1 * | 2/2013 | Kim | H02B 13/045 |
| | | | | 361/608 |
| 2019/0239379 | A1 * | 8/2019 | Smith | H01R 13/7175 |
| 2025/0038492 | A1 * | 1/2025 | Li | H02B 1/21 |
| 2025/0132541 | A1 * | 4/2025 | Li | H05K 7/20572 |
| 2025/0132542 | A1 * | 4/2025 | Li | H05K 7/20572 |

FOREIGN PATENT DOCUMENTS

| | | | | | |
|---|---|---|---|---|---|
| FR | | 2735290 | A1 | 12/1996 | |
| WO | WO-2009127594 | A2 * | 10/2009 | | H02B 11/24 |

* cited by examiner

JUNCTION BOX FOR SWITCHGEAR AND SWITCHGEAR

FIELD

Embodiments of the present disclosure generally relate to the technical field of distribution facilities, and more specifically, to a junction box for a switchgear and a switchgear.

BACKGROUND

A switchgear refers to a complete set of power distribution devices by assembling primary and secondary equipment according to a certain plan, and is mainly used to control and protect lines and equipment. Switchgears may be divided into high-voltage switchgears and low-voltage switchgears according to the voltage level of the incoming and outgoing lines. A junction box is arranged within the switchgear to supply power to multiple sets of drawers in the switchgear in a form of a supply busbar.

Existing junction boxes take power from the busbar of the switchgear through cables and distribute it to multiple drawers, resulting in a narrow space inside the switchgear, which is not conducive to the installation and maintenance of the switchgear.

SUMMARY

In a first aspect of the present disclosure, a junction box for a switchgear is provided. The junction box comprises: a base arranged within the switchgear: an output end coupled to the base and comprising: a plurality of supply busbars each arranged in the base in a lateral direction and adapted to be electrically connected to a primary incoming plug of a drawer of the switchgear at any position in the lateral direction to allow power supply to the drawer: an input end comprising a plurality of adapter pieces, the plurality of adapter pieces each coupled to the supply busbar and electrically connected to a main primary plug-in within the switchgear; and a protective housing arranged outside the plurality of supply busbars and adapted to provide insulation protection to the plurality of supply busbars.

In some embodiments, the supply busbar comprises: a connection slot extending in the lateral direction and adapted for the primary incoming plug of the drawer to be inserted at any position in the lateral direction and to be electrically connected to the supply busbar.

In some embodiments, the protective housing comprises: a plurality of splicing modules arranged in the lateral direction, and each splicing module comprising: a body: a receiving port arranged at one end of the body in the lateral direction; and an insertion port arranged at one end of the body away from the receiving port and adapted to insert the receiving port of an adjacent one of the plurality of splicing modules in the lateral direction.

In some embodiments, the protective housing further comprises: a receiving end cover arranged at a first end of the plurality of splicing modules in the lateral direction and adapted to be coupled to the insertion port of a splicing module of the plurality of splicing modules located at the first end; and an insertion end cover arranged at a second end of the plurality of splicing modules opposite the first end and coupled to the receiving port of a splicing module of the plurality of splicing modules located at the second end.

In some embodiments, the splicing module further comprises: a plurality of through holes arranged on the body and adapted for the plurality of adapter pieces to penetrate from inside of the protective housing to outside of the protective housing.

In some embodiments, the splicing module further comprises: a plurality of notches formed on the body and aligned with the plurality of connection slots in an insertion direction of the primary incoming plug of the drawer, so as to allow the primary incoming plug to pass through the notch and be inserted into the connection slot.

In some embodiments, the splicing module further comprises: at least one guide bar obliquely arranged on at least one side of the notch in a width direction, and adapted to provide guidance to the primary incoming plug during insertion of the primary incoming plug in the notch.

In some embodiments, the junction box further comprises an adapter end coupled to the base and comprising: a first wire outlet plug-in configured to be coupled to a second wire outlet plug-in on the drawer.

In some embodiments, the first wire outlet plug-in comprises at least one of a primary outlet interface, a secondary outlet interface and a communication interface.

In some embodiments, the junction box further comprises: a back cover coupled to a side of the base away from the drawer and covering and protecting at least the input end.

In some embodiments, the junction box further comprises: an insulating inner cover coupled to the back cover and arranged between the back cover and the supply busbar to establish insulation protection between the supply busbar and the back cover.

The present disclosure provides a junction box that may be coupled with drawers, and the routing directions of the incoming and outgoing wires of the drawers are separated, optimizing the wiring space in the switchgear, thereby improving the convenience of installation and maintenance of facilities in the switchgear. On the other hand, the junction box can also be connected to drawers of different specifications at the same time, and the drawers of different specifications can be arranged at any position of the supply busbar in the lateral direction, thereby improving the installation density of the drawers and the flexibility of the drawer installation in the switchgear.

In a second aspect of the present disclosure, a switchgear is provided. The switchgear comprises: a cabinet: a junction box provided according to the first aspect of the present disclosure and a plurality of drawers arranged in the cabinet and coupled to the junction box.

In some embodiments, a plurality of drawers are arranged in the lateral direction.

It should be understood that the content described in this section is not intended to limit critical or important features of embodiments of the present disclosure, nor is it used to limit the scope of the present disclosure. Other features of the present disclosure will become easier to be understood through the following description.

BRIEF DESCRIPTION OF THE DRAWINGS

The above and other features, advantages, and aspects of each embodiment of the present disclosure will become more apparent in conjunction with the accompanying drawings and with reference to the following detailed explanations. In the accompanying drawings, the same or similar reference symbols represent the same or similar elements, where.

3

Figure 2:
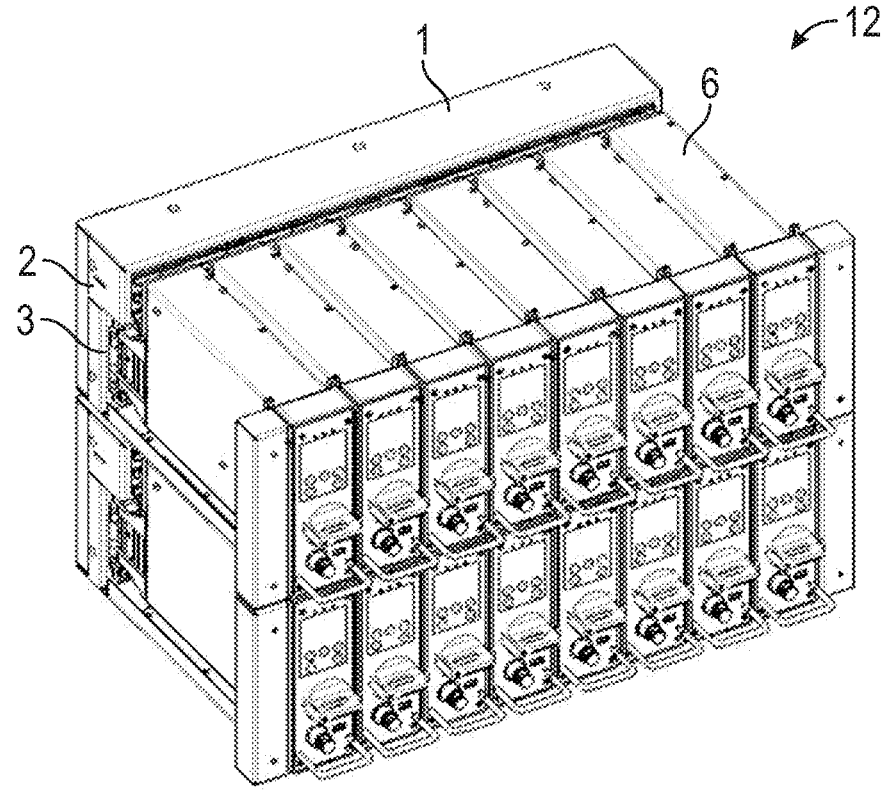
Figure 3:
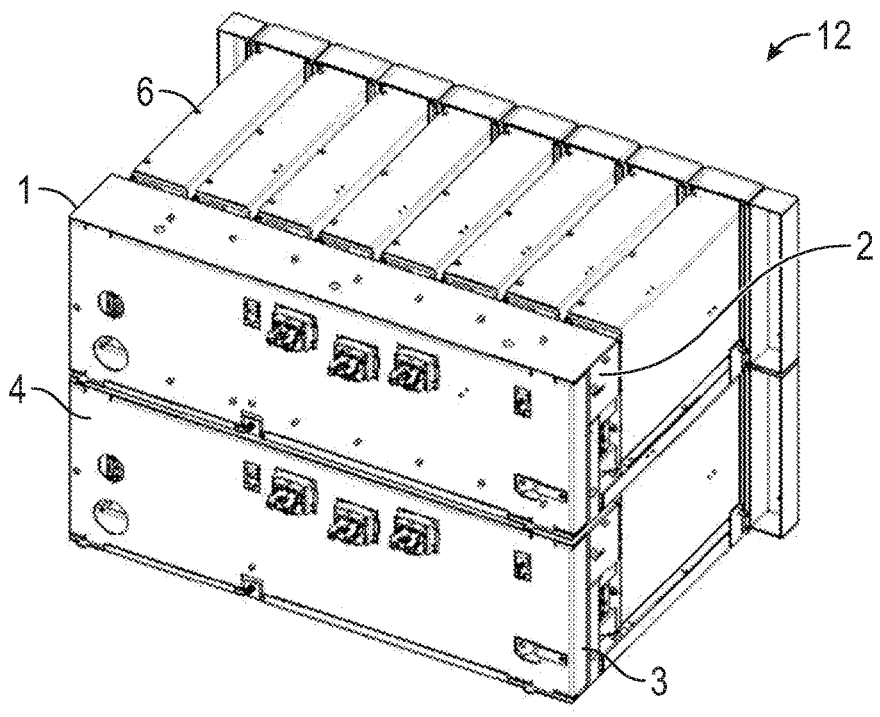
Figure 4:
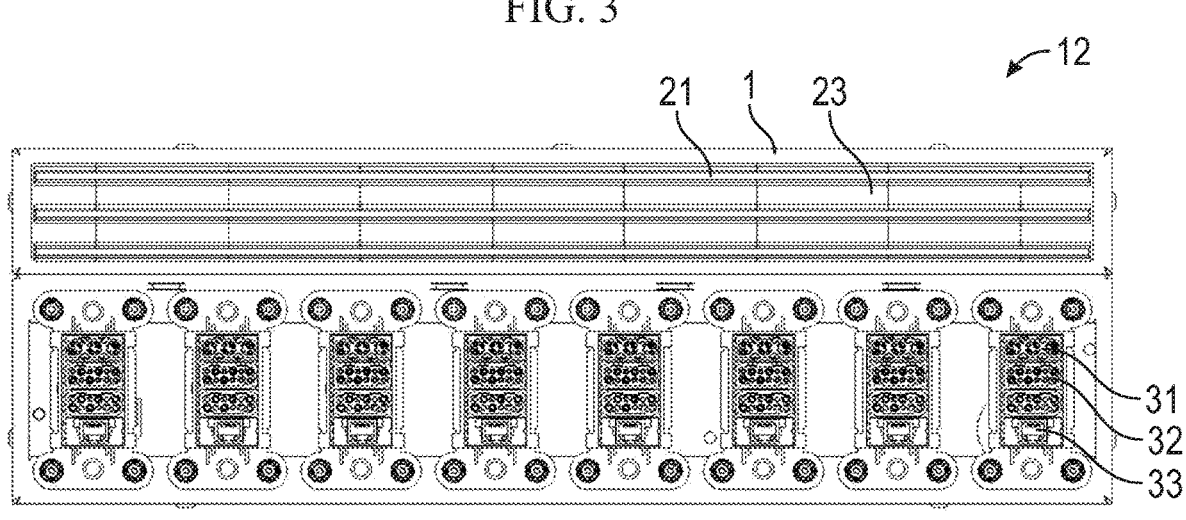
Figure 5:
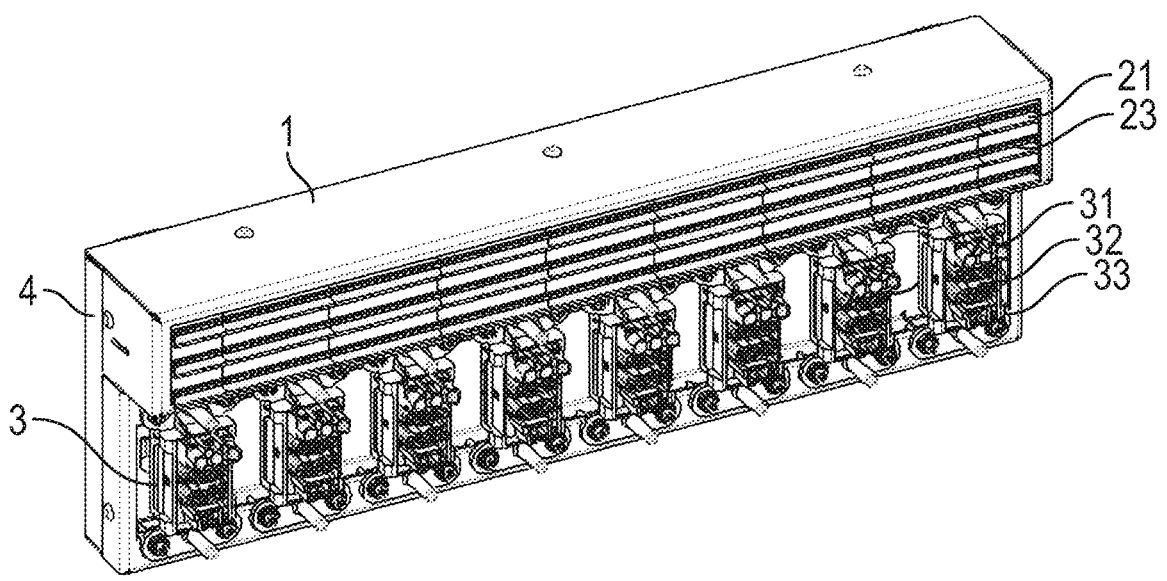
Figure 6:
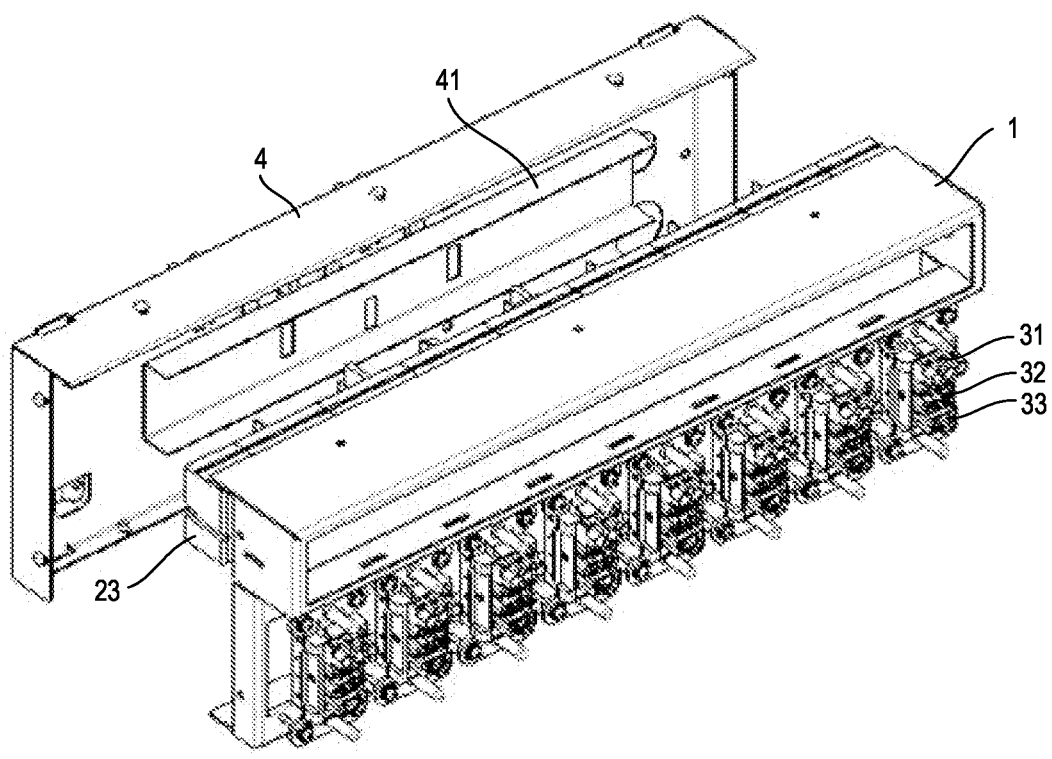
Figure 7:
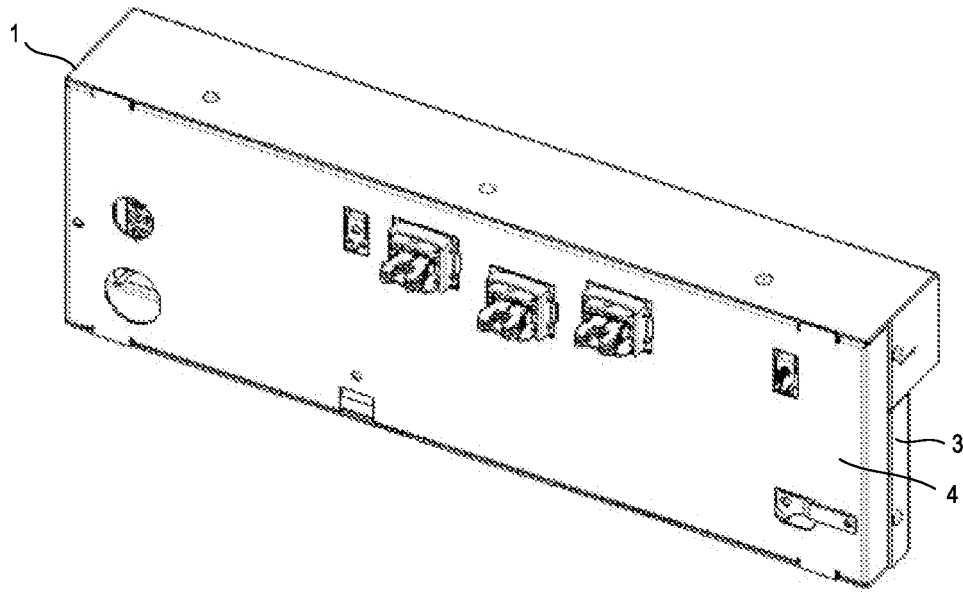
Figure 8:
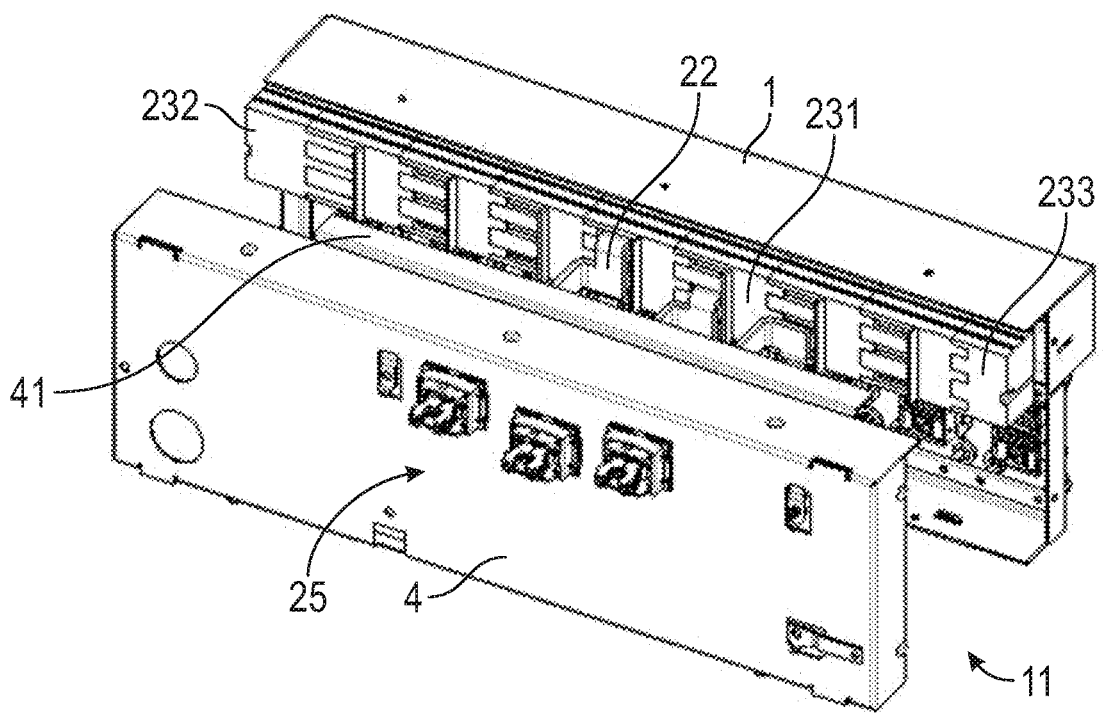
Figure 9:
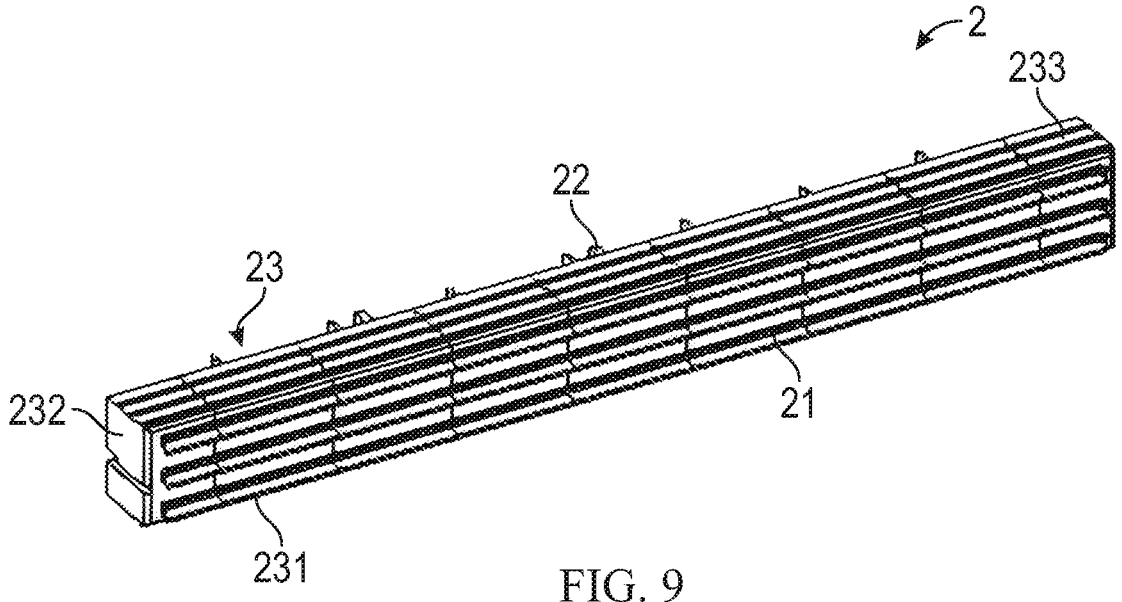
Figure 10:
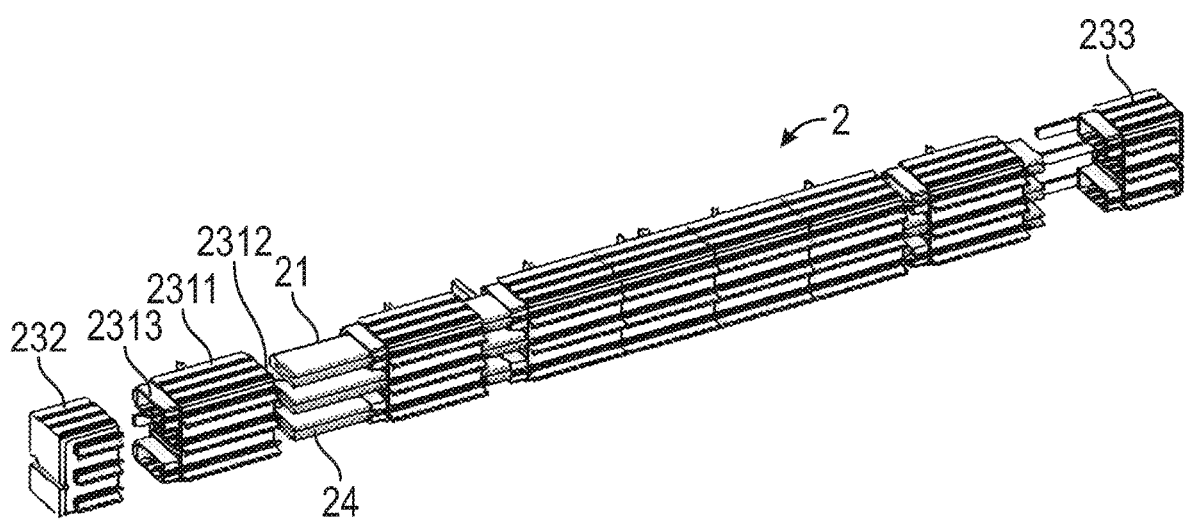
Figure 11:
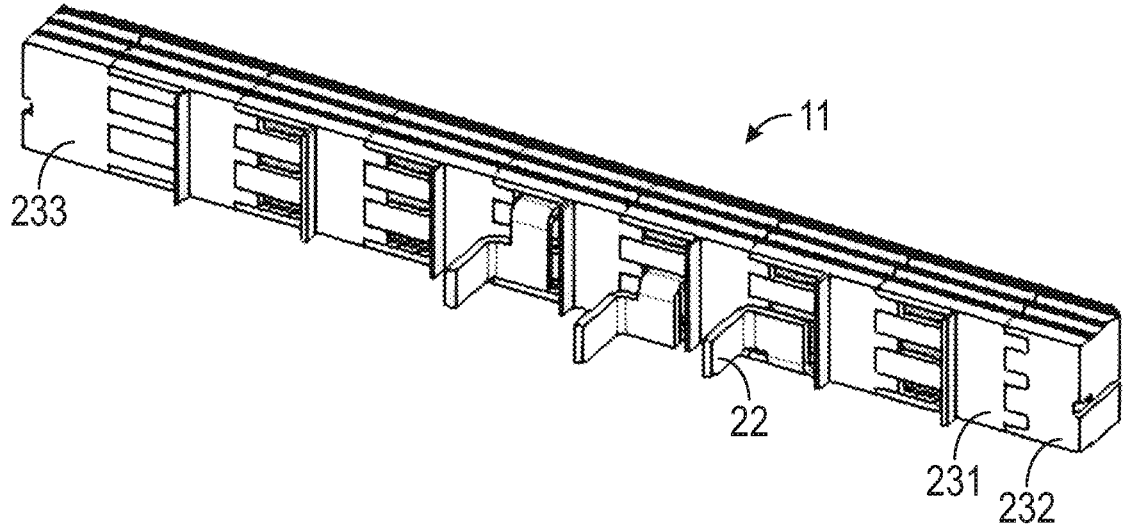
Figure 12:
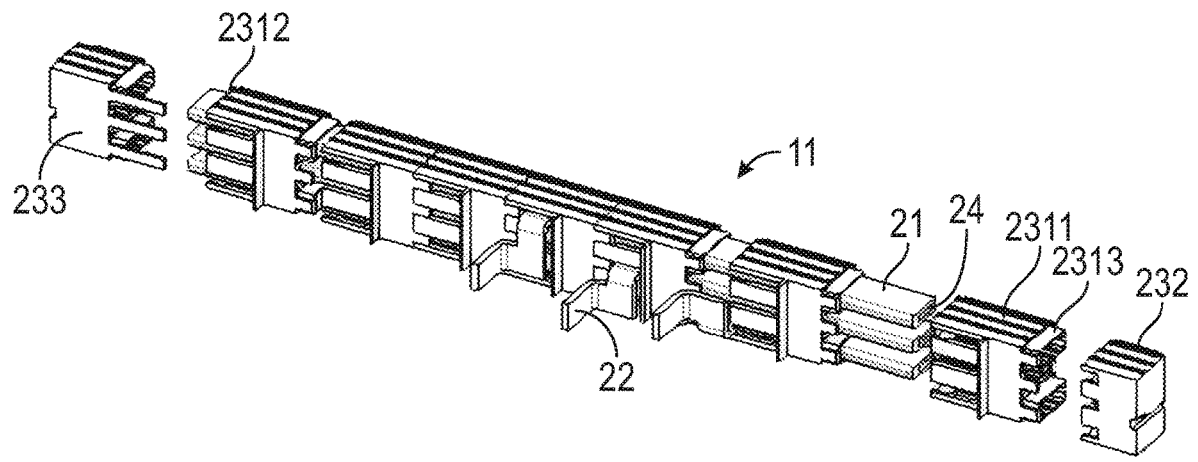
Figure 13:
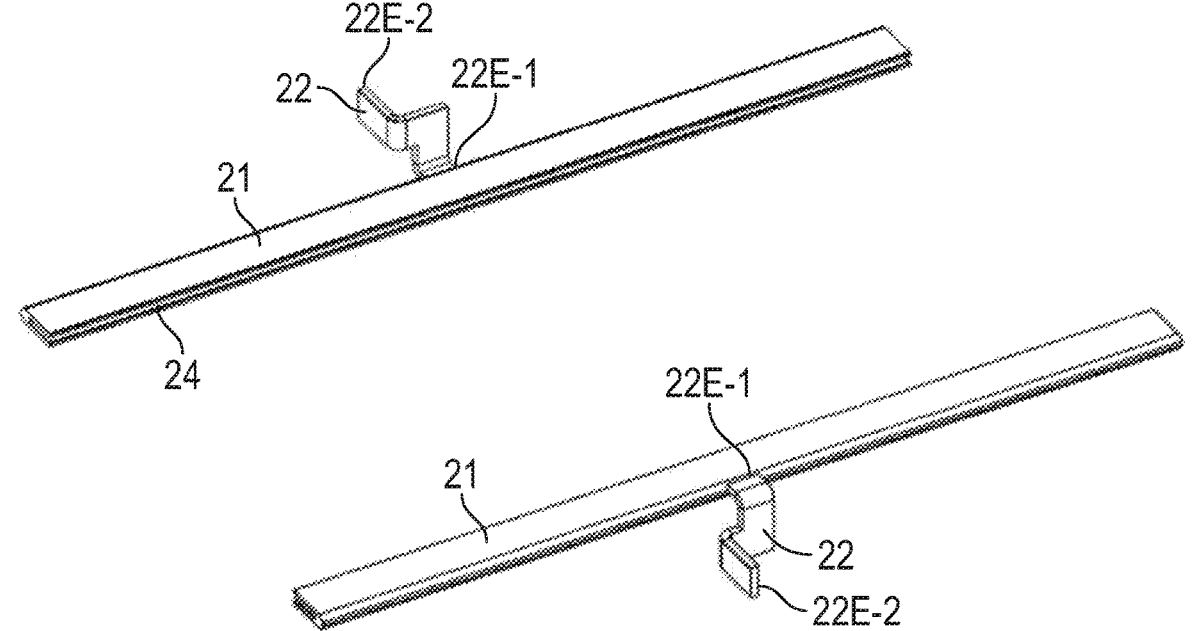
Figure 14:
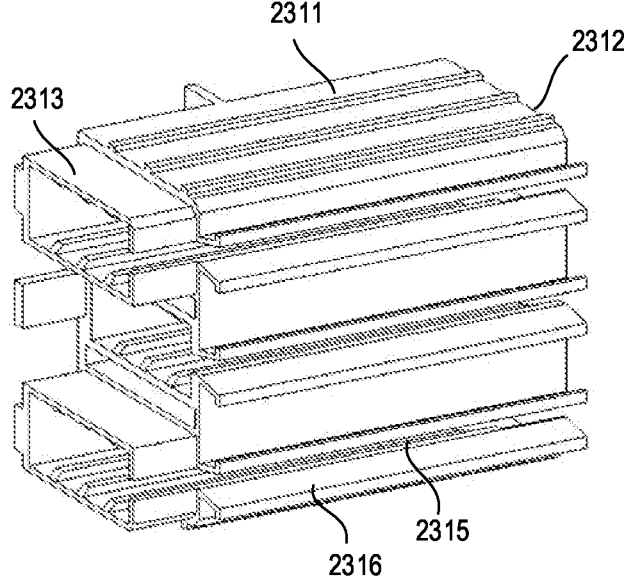
Figure 14:
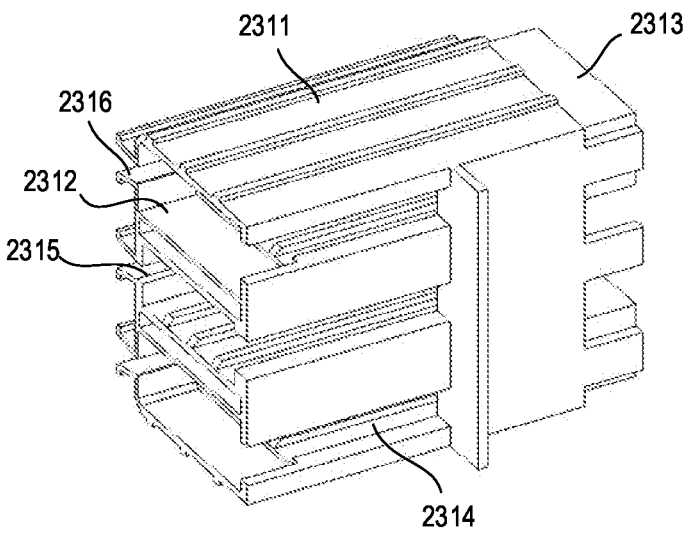
Figure 15:
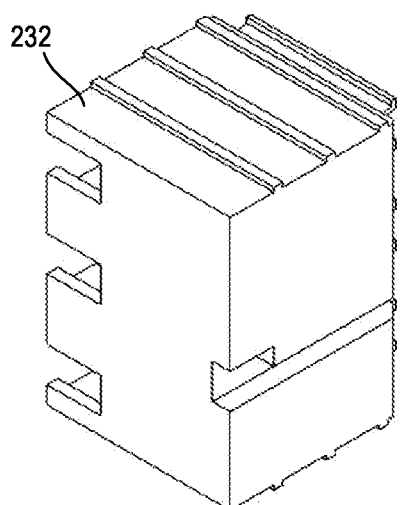
Figure 15:
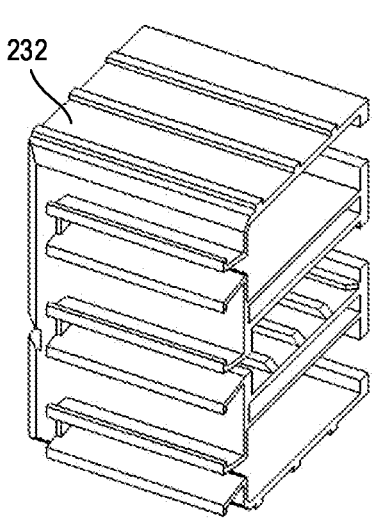
Figure 16:
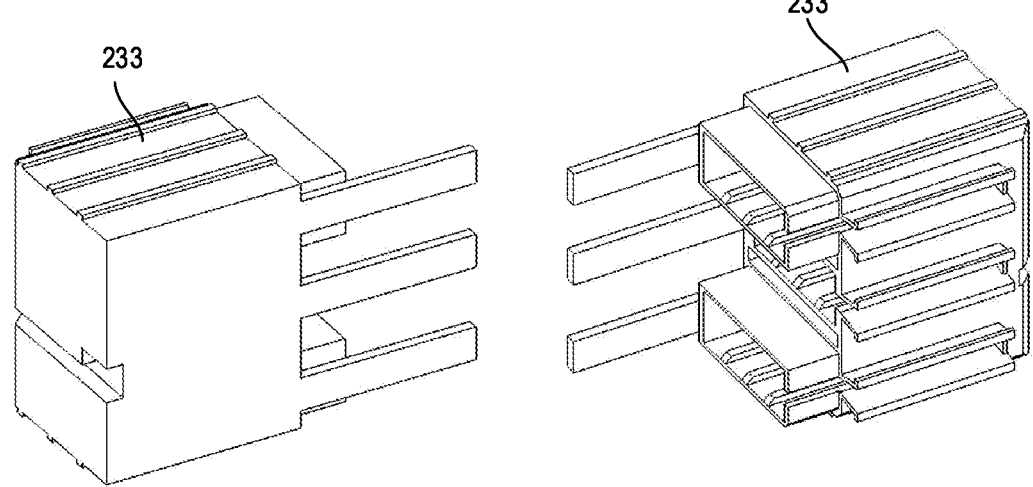
Figure 17:
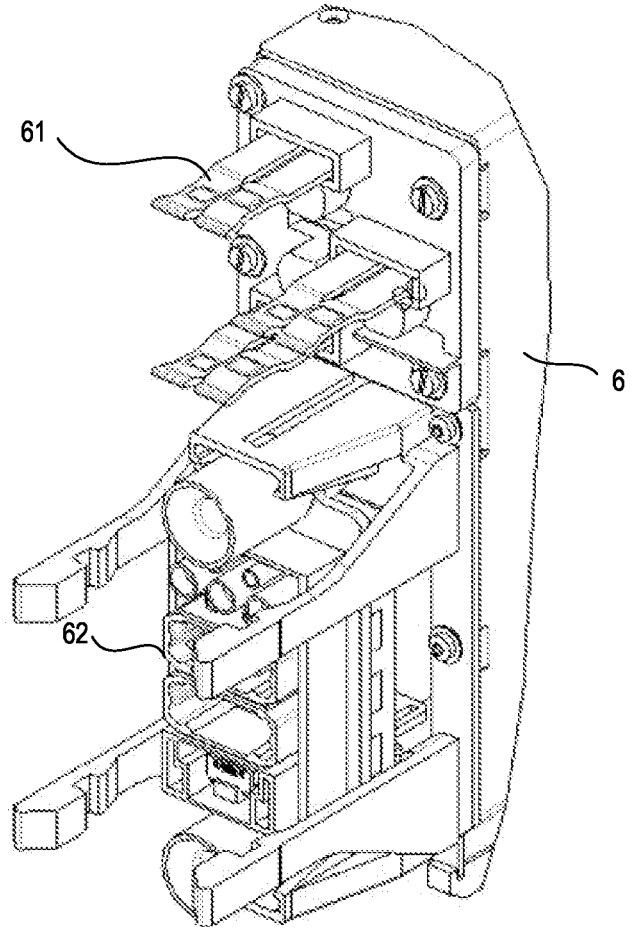
Figure 18:
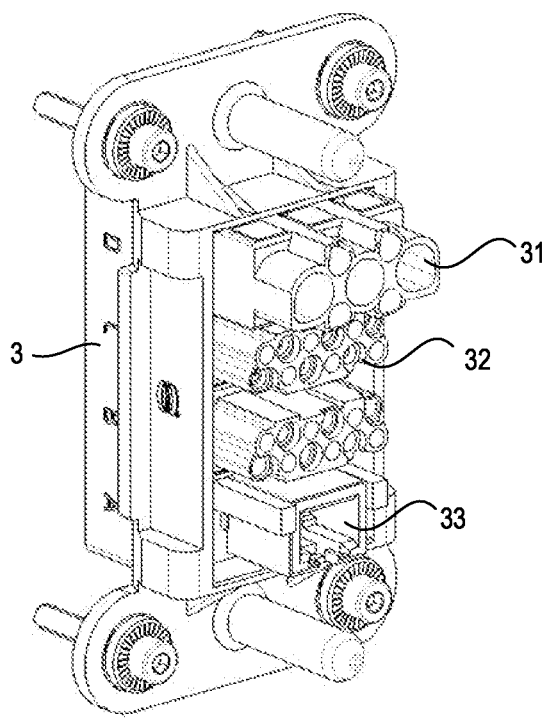
Figure 18:
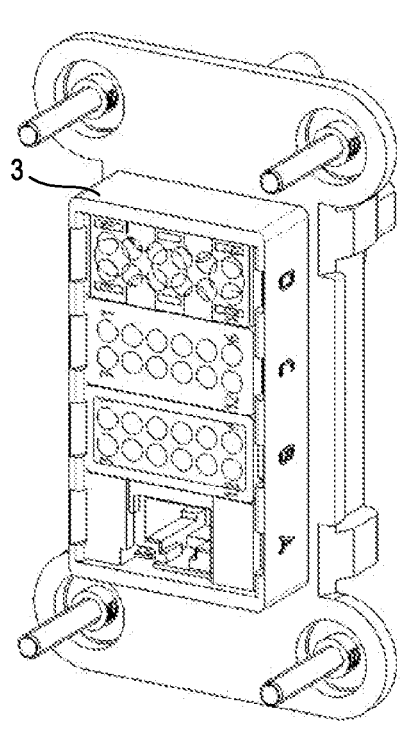

FIG. 2 shows a schematic diagram of the coupling relationship between the drawer and the junction box of embodiments of the present disclosure;

FIG. 3 shows a schematic diagram of the coupling relationship between the drawer and the junction box of embodiments of the present disclosure at another angle:

FIG. 4 shows a schematic diagram of a side of the junction box facing the drawer according to embodiments of the present disclosure:

FIG. 5 shows a schematic diagram of the overall structure of the junction box according to embodiments of the present disclosure:

FIG. 6 shows an exploded view of the internal structure of the junction box according to embodiments of the present disclosure:

FIG. 7 shows a schematic diagram of the overall structure of the junction box from another perspective according to embodiments of the present disclosure;

FIG. 8 shows an exploded view of the junction box from the perspective of FIG. 7 according to embodiments of the present disclosure:

FIG. 9 shows a schematic diagram of the overall structure of the output end of the junction box according to embodiments of the present disclosure:

FIG. 10 shows an exploded view of the output end of the junction box from the perspective of FIG. 9 according to embodiments of the present disclosure:

FIG. 11 shows a schematic diagram of the overall structure of the input end of the junction box according to embodiments of the present disclosure;

FIG. 12 shows an exploded view of the input end of the junction box from the perspective of FIG. 11 according to embodiments of the present disclosure:

FIG. 13 shows a schematic diagram of the overall structure of the adapter piece and the supply busbar when viewed at different angles according to embodiments of the present disclosure:

FIG. 14 shows a schematic diagram of the overall structure of the splicing module when viewed at different angles according to embodiments of the present disclosure;

FIG. 15 shows a schematic diagram of the structure of the receiving end cover when viewed at different angles according to embodiments of the present disclosure:

FIG. 16 shows a schematic diagram of the structure of the insertion end cover when viewed at different angles according to embodiments of the present disclosure:

FIG. 17 shows a schematic diagram of a side of the drawer facing the junction box according to embodiments of the present disclosure; and FIG. 18 shows a schematic diagram of the adapter end according to embodiments of the present disclosure.

DETAILED DESCRIPTION

Embodiments of the present disclosure will be described in more detail below with reference to the accompanying drawings. Although certain embodiments of the disclosure are illustrated in the drawings, it should be understood that the present disclosure may be embodied in various forms and should not be construed as limited to the embodiments set forth herein, but rather, these embodiments are provided for a more thorough and complete understanding of the present disclosure. It should be understood that the drawings and embodiments of the present disclosure are for illustrative purposes only and are not intended to limit the scope of the present disclosure.

In the description of embodiments of the present disclosure, the term "comprise" and its variants used herein indicate open inclusion, that is, "comprising but not limited to". The term "based on" should be interpreted as "based at least in part on". The terms "an embodiment" and "the embodiment" should be interpreted as "at least one embodiment". The term "some embodiments" should be interpreted as "at least some embodiments". Other explicit and implicit definitions may be included below. The terms "first", "second", etc., may refer to different or the same object. Other explicit and implicit definitions may also be included below.

As briefly mentioned earlier, a junction box is arranged within a switchgear for taking power from a main incoming busbar through a main primary plug-in of the switchgear and supplying power to drawers arranged in the switchgear. In the existing junction box, the main primary plug-in of the switchgear is split into two by using cables and directed to two branch primary plug-ins in the junction box respectively. The two branch primary plug-ins are respectively electrically connected to two drawers in the switchgear, so as to realize the power supply to the two drawers. In this structure, the wiring terminals of the drawers can only be arranged along a lateral direction of the switchgear, resulting in low space utilization of the back panel of the drawers, high wiring difficulty in the switchgear, and difficult separation of the primary outlets and secondary outlets of the drawer, which is not convenient for the installation and maintenance of the switchgear.

Embodiments of the present disclosure proposes a junction box for a switchgear to solve or at least partially solve the above problems and other potential problems existing in the conventional scheme. According to various embodiments of the present disclosure, the junction box is arranged inside the switchgear along the lateral direction of the switchgear, and a plurality of drawers are arranged along the lateral direction and coupled to the junction box. The drawer can slide relative to the junction box along a horizontal direction (hereinafter also referred to as the insertion direction) perpendicular to the lateral direction to achieve contact and separation with the junction box. The plurality of drawers can be arbitrarily coupled to the junction box along the lateral direction, thereby improving the convenience of installation and maintenance of the drawers in the switchgear. On the other hand, the junction box may also be connected to drawers of different specifications at the same time, and drawers of different specifications may be arranged at any position of the supply busbar in the lateral direction. In this way, installation density and installation flexibility of the drawers in the switchgear are improved.

Figure 1:
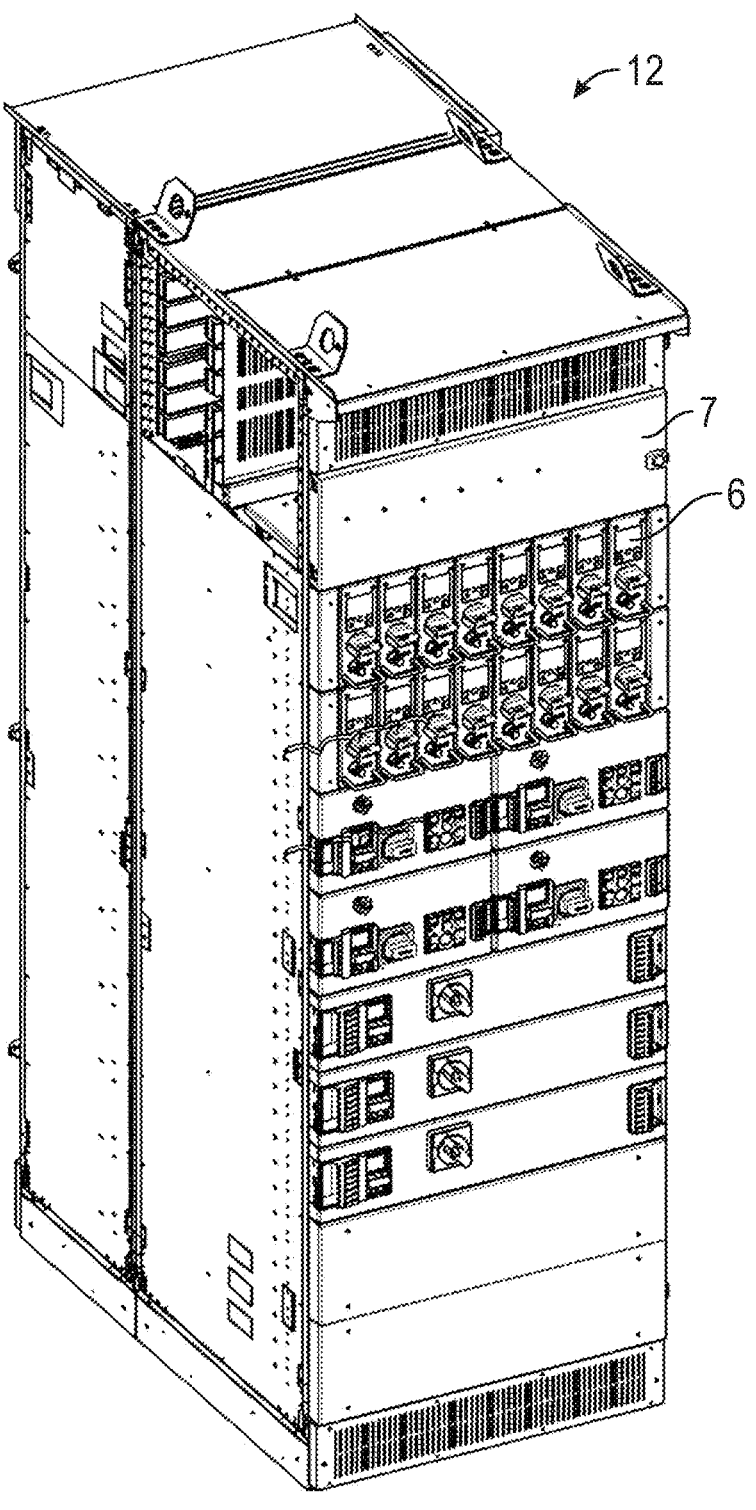
FIG. 1 shows a schematic diagram of the overall structure of a switchgear according to embodiments of the present disclosure.

FIG. 1 shows a schematic diagram of the overall structure of the switchgear according to embodiments of the present disclosure. As shown in FIG. 1, the switchgear provided according to embodiments of the present disclose generally includes a cabinet 7, a junction box 12 coupled in the cabinet 7, and drawers 6. FIGS. 2 and 3 show schematic diagrams of the coupling relationship between the drawers 6 and the junction box 12. As shown in FIGS. 2 and 3, the drawers 6 can slide in the cabinet 7 along the insertion direction and contact and separate from the junction box 12. When the drawer 6 contacts the junction box 12 in place, the junction box 12 can supply power to the drawer 6, and the junction box 12 may also receive circuit information processed by the drawer 6, so that the junction box 12 can supply power to electrical primary equipment (such as motors, transformers, circuit breakers, etc.) and/or electrical secondary equipment (such as relays, fuses, etc.).

FIGS. 4 and 5 respectively show schematic diagrams of the overall structure of the junction box 12 from different perspectives. As shown in FIGS. 4 and 5, the junction box 12 according to embodiments of the present disclosure generally comprises a base 1, an output end 2 coupled to the base 1, an input end 11 (e.g., FIGS. 8 and 11), an adapter piece 22 (e.g., FIG. 8), and a protective housing 23. The input end 11 is adapted to be electrically connected to the main primary plug-in 25 in the switchgear (i.e., the plug on the side closer to the main incoming busbar than the junction box) to be connected to the main incoming busbar through the main primary plug-in. The output end 2 is adapted to output the power input from the input end 11 to the junction box 12 to the plurality of drawers 6 coupled to the junction box. The adapter end 22E-2 of FIG. 13 is electrically connected to the drawers 6 and receives at least the current output from the primary outlets, secondary outlets, or communication wire outlets of the drawers 6 and outputs the current to the corresponding electrical appliance again through the cable. The primary outlet of the drawer 6 outputs high voltage (such as 220V, 380V, etc.) and large current to supply power to loads in the main circuit. The secondary outlet outputs low voltage (such as 24V, 36V) and small current to supply power to controllers. The communication outlet outputs an operation signal that displays the operation status of the drawer. FIG. 5 shows a schematic diagram of the overall structure of the junction box according to embodiments of the present disclosure, FIG. 6 shows an exploded view of the internal structure of the junction box according to embodiments of the present disclosure, FIG. 7 shows a schematic diagram of the overall structure of the junction box according to embodiments of the present disclosure from another perspective, and FIG. 8 shows an exploded view of the junction box according to embodiments of the present disclosure from the perspective of FIG. 7. As shown in FIGS. 5 to 8, in some embodiments, the junction box also comprises a back cover 4 coupled to the side of the base 1 away from the drawer 6. The back cover 4 is shielded on the side of the junction box away from the drawer 6 and is used to shield the input end and provide protection for the input end. On the back cover 4, a through hole may be provided for the main primary plug-in to pass through to be connected to the main incoming busbar. A side of the back cover 4 toward the output end 2 is also coupled with an insulating inner cover 41 which is disposed between the supply busbar 21 and the back cover 4 and for reinforcing the insulating properties between the back cover 4 and the supply busbar 21. The insulating inner cover 41 is also provided with an opening adapted for the input end (e.g., an adapter piece 22 to be mentioned below) through.

FIG. 9 shows a schematic diagram of the overall structure of the output end 2 of the junction box 12 according to embodiments of the present disclosure, FIG. 10 shows an exploded view of the output end 2 of the junction box according to embodiments of the present disclosure from the perspective of FIG. 9, FIG. 11 shows a schematic diagram of the overall structure of the input end 11 of the junction box according to embodiments of the present disclosure, and FIG. 12 shows an exploded view of the input end 11 of the junction box 12 according to embodiments of the present disclosure from the perspective of FIG. 11. As shown in FIGS. 9 to 12, the output end 2 comprises a plurality of supply busbars 21 arranged in the protective housing 23. The input end 11 comprises a plurality of adapter pieces 22 coupled to the plurality of supply busbars 21. One end 22E-1 of the adapter piece 22 is electrically connected to the supply busbar 21, and the other end 22E-2 is electrically connected to the main primary plug-in 25 of the switchgear and is adapted to draw power from the main primary plug-in and supplying power to the supply busbar 21. The supply busbar 21 is adapted to supply power to the drawers 6. In some embodiments, the adapter piece 22 and the supply busbar 21 may be integrally formed, or may be coupled together by welding, fastener connection or the like. In some embodiments, the entire supply busbar 21 is elongated, and the supply busbar 21 extends in the lateral direction of the switchgear, so that a plurality of drawers 6 in the switchgear may be arranged in the lateral direction of the switchgear and electrically connected to the supply busbar 21.

FIG. 13 shows a schematic diagram of the overall structure of the adapter piece 22 and the supply busbar 21. As shown in FIG. 13, in some embodiments, the supply busbar 21 comprises a connection slot 24. The opening of the connection slot 24 faces the opening of the switchgear, and the length direction of the connection slot 24 extends along the lateral direction of the switchgear. The side of the drawer 6 facing the opening of the connection slot 24 is arranged with a primary incoming plug 61, which is sheet-shaped and can be inserted into the connection slot 24 and abuts against the inner wall of the connection slot 24, thereby realizing the electrical connection between the drawer 6 and the output end 2 of the junction box.

In some embodiments, the adapter piece 22 may be coupled to the supply busbar 21 away from the opening of the connection slot 24, that is, the main primary plug-in in the switchgear and the primary incoming plug 61 of the drawer 6 are respectively located on two sides of the junction box, thereby saving space in the switchgear while also decreasing maintenance difficulty of the switchgear.

It should be understood that the number of supply busbars 21, adapter pieces 22, connection slots 24, and the notches 2315 and guide bars 2316 mentioned below correspond to the number of phases of the power supply. For example, in some embodiments, if the power supply is a three-phase power supply, the supply busbars 21, connection slots, and adapter pieces 22 of the output end 2 are configured in three groups, and the number of the notches 2315 mentioned below is also three, and the number of the guide bars 2316 is three pairs. It should be understood that in a case where the phases of power supply have other numbers (e.g., numbers such as two-phase or four-phase), the supply busbars 21 and adapter pieces 22 may also have corresponding numbers, respectively. The concept of the present disclosure will be described mainly by taking the number of phases as three phases as an example. It should be understood that the situation is similar for other numbers of phases, which will not be repeated separately below. The three groups of supply busbars 21 and adapter pieces 22 are arranged in a vertical direction (i.e., the height direction of the switchgear) perpendicular to the lateral direction of the switchgear. The length direction of a single supply busbar 21 is arranged in the lateral direction, a plurality of supply busbars 21 are arranged the vertical direction, so that a plurality of drawers 6 may be arranged in the lateral direction in the switchgear, thereby saving space in the cabinet and facilitating the installation of the switchgear.

FIG. 14 shows a schematic diagram of the overall structure of the splicing module 231 according to embodiments of the present disclose. As shown in FIG. 14, in some embodiments, the protective housing 23 comprises a plurality of splicing modules 231 arranged along the lateral direction and coupled to each other. Specifically, each splicing module 231 comprises a body 2311, a receiving port 2312 and a insertion port 2313 respectively coupled to both ends of the body 2311. It should be understood that the number of splicing modules 231 and the number of drawers 6 mentioned above are independent of the number of power supplies, and the number of splicing modules 231 and the number of drawers 6 are also independent. When the plurality of splicing modules 231 are spliced along the lateral direction, the insertion port 2313 of each splicing module 231 is inserted into the receiving port 2312 of adjacent splicing module 231, thereby realizing the coupling and fixing of adjacent splicing modules 231. In some embodiments, the body 2311 of the splicing module 231 is integrally formed with the receiving port 2312 and the insertion port 2313, for example, the splicing module 231 can be blow molded as a whole. In other embodiments, the body 2311 and the receiving port 2312 and the insertion port 2313 may also be coupled together by gluing or the like. The interior of the splicing module 231 is hollow and adapted to accommodate the supply busbar 21. In other words, the plurality of splicing modules 231 can be sequentially sleeved on the supply busbar 21 along the lateral direction, and adjacent supply busbars 21 are fixed together by coupling the receiving port 2312 and the insertion port 2313, so that the plurality of splicing modules 231 are connected as a whole to provide fixing and insulation protection for the supply busbar 21.

FIG. 15 shows a schematic diagram of the structure of a receiving end cover 232 according to embodiments of the present disclosure, and FIG. 16 shows a schematic diagram of the structure of the insertion end cover 233 according to embodiments of the present disclosure. As shown in FIGS. 15 and 16, in some embodiments, the protective housing 23 further comprises a receiving end cover 232 and an insertion end cover 233, which are arranged at both ends of the plurality of splicing modules 231 that are spliced together. The receiving end cover 232 is adapted to be coupled to the insertion port 2313 located at the end of the plurality of splicing modules 231, and the receiving end cover 232 may be coupled to the splicing module 231 and close the end of the plurality of splicing modules 231. In addition, the insertion end cover 233 is arranged at the other end of the plurality of splicing modules 231 away from the receiving end cover 232 and inserted into the receiving port 2312 located at the corresponding end, thereby closing the other end of the plurality of splicing modules 231. On the one hand, this arrangement of the receiving end cover 232 and the insertion end cover 233 being coupled to the splicing module 231 improves the integrity of the protective housing 23 and enhances the insulation protection ability of the protective housing 23 to the supply busbar 21. On the other hand, the receiving end cover 232 and the insertion end cover 233 are respectively coupled to the two ends of the plurality of splicing modules 231, and may also be used to fix the supply busbar 21. The receiving end cover 232 and the insertion end cover 233 respectively abut against the two ends of the supply busbar 21 in the length direction, so that the supply busbar 21 and the protective housing 23 are fixed in the lateral direction.

As shown in FIG. 14, in some embodiments, a through hole 2314 is also opened on the splicing module 231, which is located on the side of the splicing module 231 away from the drawer 6, for the adapter piece coupled to the supply busbar 21 to extend to the outside of the protective housing 23 and to be coupled with the main primary plug-in 25 of the-switchgear. In some embodiments, the through hole 2314 on the splicing module 231 is provided with three (corresponding to three-phase electricity) along the vertical direction perpendicular to the lateral direction to allow the three adapter pieces 22 on the supply busbar 21 to pass to the outside of the protective housing 23, respectively. In some embodiments, the length of the through hole 2314 is equal to the length of the splicing module 231, that is, when the plurality of splicing modules 231 are sequentially spliced in the lateral direction, the through holes 2314 of adjacent splicing modules 231 are in communication. On this basis, the three adapter pieces 22 may be respectively coupled at different positions in the length direction of the supply busbar 21, so that the three supply busbars 21 is mounted inside the protective housing 23, and three adapter pieces 22 offset in the lateral direction, thereby facilitating the main primary plug-in of the switchgear is electrically connected to the three adapter pieces 22.

It should be understood that in order to facilitate the primary incoming plug 61 of the drawer 6 to be inserted into the connection slot 24 along the insertion direction and electrically connected to the supply busbar 21, a notch 2315 is also provided on the splicing module 231, which is arranged on the side of the splicing module 231 facing the primary incoming plug 61 and aligned with the connection slot 24 of the supply busbar 21 in the insertion direction. In some embodiments, to facilitate insertion of the drawers 6 into the junction box in any combination form (i.e., the drawer 6 may be inserted into the junction box at any position in the lateral direction), the length of the notch 2315 in the lateral direction is equal to that of the splicing module 231 in the lateral direction (i.e., the notches 2315 on the adjacent splicing modules 231 are in communication). In some embodiments, for the case of three-phase electricity, the splicing module 231 may comprise three notches 2315 which are arranged in the vertical direction to fit three supply busbars 21 mounted in the protective housing 23.

As shown in FIG. 14, in some embodiments, the splicing module 231 further comprises a guide bar 2316. In some embodiments, the guide bar 2316 is arranged with at least one pair, and each guide bar 2316 extends along the lateral direction. A pair of guide bars 2316 are obliquely coupled at the two edges of the notch 2315 along the vertical direction, respectively, and the spacing between the pair of guide bars 2316 gradually increases as they move away from the edges of the notch 2315. When the drawer 6 slides towards the junction box and the primary incoming plug is inserted into the connection slot 24, the guide bar 2316 can play a guiding role, making it more convenient for the primary incoming plug to be inserted into the notch 2315. On the other hand, the combination of the notch 2315 and the pair of guide bars 2316 arranged on both sides of the notch 2315 can also improve the dust and water resistance level of the protective housing 23. For example, in some embodiments, when the drawer 6 is withdrawn from the junction box, the protective housing 23 can ensure that the junction box meets the isolation requirements required by at least IP20B in the switchgear. In some embodiments where the three-phase electricity is used, the guide bar 2316 may be provided with three pairs, respectively, to correspond to the three notches 2315 on the splicing module 231.

FIG. 17 shows a schematic diagram of the junction box facing the drawer 6 according to embodiments of the present disclosure, and FIG. 18 shows a schematic diagram of the adapter end of the junction box according to embodiments of the present disclosure. Referring to FIGS. 17 and 18 in conjunction with FIGS. 4 and 5, the adapter end and the output end 2 of the junction box are arranged in the vertical direction, for example, the adapter end can be arranged below the output end 2. The adapter end comprises a first wire outlet plug-in 3, which is coupled to a second wire outlet plug-in 62 arranged on the drawer 6. The first wire outlet plug-in 3 may comprise one or more of a primary outlet interface 31, a secondary outlet interface 32, and a communication interface 33. Correspondingly, the second wire outlet plug-in 62 on the drawer 6 may also comprise interfaces that cooperate with the primary outlet interface 31, the secondary outlet interface 32, the communication interface 33, etc. The primary outlet interface 31 is adapted to output a high voltage (e.g., 220V, 380V, etc.) and a large current for supplying power to loads in the main circuit, and the secondary outlet interface 32 is adapted to output a low voltage (e.g., 24V, 36V) and a small current control circuit. The communication interface 33 is adapted to output an operation signal indicating the operation condition of the drawer 6. When the drawer 6 is installed in place in the switchgear, the primary incoming plug 61 on the drawer 6 is coupled to the output end 2, and the second wire outlet plug-in 62 on the drawer 6 is coupled to the adapter end, thereby facilitating the direct plug-in use of the drawer 6.

The output end 2 and the adapter end of the junction box are distributed along the vertical direction. This arrangement can facilitate the isolation of various types of outgoing wires in the switchgear. For example, the output end 2 can be located above the adapter end. The cable connected to the primary outlet interface 31 can be routed upwardly in the vertical direction on the side of the junction box away from the drawer 6, or it can be routed upwardly in the vertical direction and then routed along the lateral direction to a first side of the switchgear. For the cable connected to the secondary outlet interface, it can be routed downward in the vertical direction, or it can be routed along the lateral direction to a second side of the switchgear opposite to the first side after being routed downward in the vertical direction. Thus, the cable connected to the primary outlet interface and the cable connected to the secondary outlet interface are separated in space, which facilitates the maintenance of the switchgear on the one hand and reduces the interference between different cables on the other hand.

In some embodiments, drawers of different specifications may be installed simultaneously in the same lateral direction of the switchgear, such as ⅛ drawers, ¼ drawers, and ½ drawers. Specifically, the ⅛ drawer means that the width of the drawer is ⅛ of the width of the switchgear in the lateral direction, and up to eight ⅛ drawers can be installed simultaneously in the same lateral direction of the switchgear. Similarly, the ¼ drawer means that the width of the drawer is ¼ of the width of the switchgear in the lateral direction, and up to four ¼ drawers can be installed simultaneously in the same lateral direction of the switchgear. The ½ drawer means that the width of the drawer is ½ of in the lateral direction of the switchgear, and up to two ½ drawers can be installed simultaneously in the same lateral direction of the switchgear. Installing drawers of different specifications at the same time means that any two or three of the above three specifications of drawers can be installed simultaneously in the lateral direction of the switchgear. For example, in the lateral direction of the switchgear, there may be two ⅛ drawers, one ¼ drawer, and one ½ drawer installed at the same time. In addition, it should be emphasized that drawers of various specifications can be inserted into the connection slot 24 at any position in the lateral direction through their respective primary incoming plugs 61 to be electrically connected with the supply busbar 21. That is to say, drawers of various specifications can be arranged at any position of the supply busbar 21 in the lateral direction, which can improve the installation density of the drawers in the switchgear, effectively optimize the spatial layout in the switchgear, and improve the convenience of installation and maintenance of facilities in the switchgear.

It should be understood that the above specifications of drawers 6 and installation of drawers 6 are only illustrative and are not intended to limit the scope of the present disclosure. In fact, in actual production, users can install the appropriate specifications and quantities of drawer 6 according to actual needs.

The above has described the various implementations of the present disclosure. The above description is exemplary, not exhaustive, and is not limited to the various implementations disclosed. Without departing from the scope and spirit of the various implementations described, many modifications and changes are obvious to those skilled in the art. The choice of terminology used in this article is intended to best explain the principles, practical applications, or improvements to the technology in the market, or to enable other ordinary technicians in the art to understand the various implementations disclosed in this article.

What is claimed is:

1. A junction box for a switchgear comprising:
   a base arranged within the switchgear;
   an output end coupled to the base and comprising a plurality of supply busbars each arranged within the base in a lateral direction and adapted to be electrically connected to a primary incoming plug of a drawer of the switchgear at any position in the lateral direction to allow power supply to the drawer;
   an input end comprising a plurality of adapter pieces, the plurality of adapter pieces each coupled to the plurality of supply busbars and electrically connected to a main primary plug-in within the switchgear; and
   a protective housing arranged outside the plurality of supply busbars and adapted to provide insulation protection to the plurality of supply busbars.

2. The junction box of claim 1, wherein the supply busbar comprises:
   a connection slot extending in the lateral direction and adapted for the primary incoming plug of the drawer to be inserted at any position in the lateral direction and to be electrically connected to the plurality of supply busbars.

3. The junction box of claim 2, wherein the protective housing comprises:
   a plurality of splicing modules arranged in the lateral direction, and each respective one of the splicing modules comprising:
   a body;
   a receiving port arranged at one end of the body in the lateral direction; and
   an insertion port arranged at one end of the body away from the receiving port and adapted to be inserted into the receiving port of an adjacent one of the plurality of splicing modules in the lateral direction.

4. The junction box of claim 3, wherein the protective housing further comprises:
   a receiving end cover arranged at a first end of the plurality of splicing modules in the lateral direction and adapted to be coupled to the insertion port of a splicing module of the plurality of splicing modules located at the first end; and
   an insertion end cover arranged at a second end of the plurality of splicing modules opposite the first end and coupled to the receiving port of a splicing module of the plurality of splicing modules located at the second end.

5. The junction box of claim 3, wherein the splicing module further comprises:

a plurality of through holes arranged on the body and adapted for the plurality of adapter pieces to penetrate from inside of the protective housing to outside of the protective housing.

6. The junction box of claim 3, wherein the splicing module further comprises:

a plurality of notches formed on the body and aligned with a plurality of connection slots in an insertion direction of the primary incoming plug of the drawer, so as to allow the primary incoming plug to pass through the plurality of notches and be inserted into the connection slot.

7. The junction box according to claim 6, wherein the splicing module further comprises:

at least one guide bar obliquely arranged on at least one side of a notch of the plurality of notches in a width direction, and adapted to provide guidance to the primary incoming plug during insertion of the primary incoming plug into the notch.

8. The junction box of claim 1, further comprising an adapter end coupled to the base and comprising:

a first wire outlet plug-in configured to be coupled to a second wire outlet plug-in on the drawer.

9. The junction box of claim 8, wherein the first wire outlet plug-in comprises at least one of a primary outlet interface, a secondary outlet interface and a communication interface.

10. The junction box of claim 8, further comprising:

a back cover coupled to a side of the base away from the drawer and covering and protecting at least the input end.

11. The junction box of claim 10, further comprising:

an insulating inner cover coupled to the back cover and arranged between the back cover and the plurality of supply busbars to establish insulation protection between the plurality of supply busbars and the back cover.

12. A switchgear comprising:

a cabinet;

the junction box of claim 1; and a plurality of drawers arranged within the cabinet and coupled to the junction box.

13. The switchgear of claim 12, wherein the plurality of drawers are arranged in a lateral direction.

* * * * *